US011573639B1

(12) United States Patent
Sheikholeslami et al.

(10) Patent No.: US 11,573,639 B1
(45) Date of Patent: Feb. 7, 2023

(54) APPARATUS AND METHODS FOR LOCALIZING ONE OR MORE EFFECTS IN A HAPTIC INTERFACE

(71) Applicant: IMMERSION CORPORATION, San Francisco, CA (US)

(72) Inventors: Majid Sheikholeslami, Burlington (CA); Danny A. Grant, Montreal (CA); Lionel Bravard, Montreal (CA); Christopher Ullrich, Ventura, CA (US); Vahid Khoshkava, Laval (CA); Jamal Saboune, Montreal (CA); Juan Manuel Cruz Hernandez, Westmount (CA)

(73) Assignee: IMMERSION CORPORATION, San Francisco, CA (US)

( * ) Notice: Subject to any disclaimer, the term of this patent is extended or adjusted under 35 U.S.C. 154(b) by 0 days.

(21) Appl. No.: 17/506,035

(22) Filed: Oct. 20, 2021

(51) Int. Cl.
*G06F 3/041* (2006.01)
*G06F 3/01* (2006.01)

(52) U.S. Cl.
CPC .................................. *G06F 3/016* (2013.01)

(58) Field of Classification Search
None
See application file for complete search history.

(56) References Cited

U.S. PATENT DOCUMENTS

| 10,504,342 B1 | 12/2019 | Khoshkava et al. |
| 10,579,146 B2 | 3/2020 | Cruz-Hernandez et al. |
| 10,649,532 B2 | 5/2020 | Cruz-Hernandez et al. |
| 2008/0122797 A1* | 5/2008 | Soh .......... G06F 3/016 345/173 |
| 2022/0137706 A1* | 5/2022 | Giraud .................. B06B 1/0622 345/173 |

* cited by examiner

*Primary Examiner* — Carl Adams
(74) *Attorney, Agent, or Firm* — Nath, Goldberg & Meyer; Jerald L. Meyer; Gregory B. Kang (57) ABSTRACT

Apparatus and methods for localizing one or more effects in a haptic interface with a user interface having a primary zone and at least one secondary zone are provided. When a desired haptic effect is generated within the primary zone, unwanted resultant haptic effects in the at least one secondary zone may be suppressed. A primary actuator is located in the primary zone, and at least one secondary actuator is located in the at least one secondary zone. At least one controller selectively and controllably generates the haptic effect produced by the primary actuator in the primary zone, and selectively and controllably actuates the at least one secondary actuator within the at least one secondary zone to generate a suppression effect therein. The at least one secondary actuator can be used to localize and/or amplify the haptic effect through constructive and/or destructive interference. Numerous other aspects are provided.

21 Claims, 11 Drawing Sheets

APPARATUS AND METHODS FOR LOCALIZING ONE OR MORE EFFECTS IN A HAPTIC INTERFACE

CROSS-REFERENCE TO RELATED APPLICATION

The present Application for Patent is related to co-pending U.S. patent application Ser. No. 17/506,148, titled "Systems and Methods for Controlling a Multi-Actuator System to Generate a Localized Haptic Effect", filed concurrently herewith on Oct. 20, 2021, which is commonly assigned and hereby incorporated by reference in its entirety.

BACKGROUND

1. Field

The disclosure of the present patent application relates to haptic interfaces, and particularly to an apparatus and methods for localizing one or more effects in a haptic interface.

2. Description of the Related Art

Haptic interfaces are user interfaces which provide vibrotactile or kinesthetic sensation or feedback to the user, which the user can feel directly or through an intermediate object located between the interface and the user, such as a stylus. A typical haptic interface may include a user interface, such as a touch surface or the like, with one or more actuators coupled to or embedded in the touch surface to provide haptic effects to the touch surface. Conventional actuators include piezoelectric actuators, electromechanical vibrators, linear resonant actuators (LRAs), voice coil motors (VCMs), solenoids and the like, and are driven to produce local haptic effects on the touch surface, thus allowing the user to experience the haptic effect when interacting with the touch surface.

Localization of haptic effects at a desired location on the touch surface typically requires multiple such actuators to be utilized, such that for any given point on the user interface, at least one actuator is provided in the general vicinity thereof. Since the touch surface is typically in the form of a single panel, the haptic effect generated by a single actuator at a single location can potentially be transmitted into other regions of the touch surface where no haptic effect is required or desired. Since there are multiple actuator inputs in a single surface in such devices, the vibration caused by haptic effects generated by any actuator can propagate to other locations, thus limiting the localization effect.

With the increased incorporation of actuators into touch panels, touch surfaces and the like, the problem of unwanted haptic effect transmission throughout the surface is increasing, particularly since such devices typically make use of virtual keyboards, virtual keypads, virtual arrays of control buttons, virtual sliders and the like, where the corresponding haptic effects are provided by corresponding arrays of actuators. Although providing arrays of actuators to correspond with arrays of virtual keys and the like enhances the haptic feedback provided to the user, it also greatly increases the problem of unwanted haptic effect transmission across the touch surface. Thus, an apparatus and methods for localizing one or more effects in a haptic interface solving the aforementioned problems are desired.

SUMMARY

The apparatus and methods for localizing one or more effects in a haptic interface are used with a user interface having a primary zone and at least one secondary zone. When a desired haptic effect is generated within the primary zone, the apparatus and methods for localizing one or more effects in a haptic interface are used to suppress unwanted resultant haptic effects in the at least one secondary zone. A primary actuator is located in the primary zone, and at least one secondary actuator is located in the at least one secondary zone. At least one controller is in communication with the primary actuator and the at least one secondary actuator.

The at least one controller selectively and controllably generates the haptic effect produced by the primary actuator in the primary zone, with the generation of the haptic effect being based on a set of effect parameters, such as amplitude, frequency, number of cycles, as well as any other suitable parameters. The at least one controller selectively and controllably actuates the at least one secondary actuator within the at least one secondary zone to generate a suppression effect therein. The suppression effect is selectively controllable by the at least one controller to suppress the haptic effect within the at least one secondary zone through destructive interference between the suppression effect and the haptic effect within the at least one secondary zone.

At least one secondary sensor may be located in the at least one secondary zone. The at least one secondary sensor is in communication with the at least one controller, such that the at least one secondary actuator may be actuated to generate the suppression effect when the haptic effect is detected in the at least one secondary zone by the at least one secondary sensor. The at least one controller may generate secondary control signals for the at least one secondary actuator based on feedback from the at least one secondary sensor located in the at least one secondary zone; e.g., based on feedback from the at least one secondary sensor, the at least one controller is able to selectively and controllably tune the suppression effect being generated by the at least one secondary actuator to suppress the haptic effect. It should be understood that any suitable type of tuning may be used to control the output of the secondary actuator in generation of the suppression effect. As a non-limiting example, tuning may be performed at the controller level, with further tuning taking place at the next process level, such as, for example, tuning of the gains (or any other suitable type of tunable parameter), tuning of the equations used by the controller, or selecting a different controller with different equations and/or gains. Non-limiting examples of tunable gains include, but are not limited to, proportional-integral-derivative (PID) gains, feedback gains, compensator gains and the like.

Alternatively, one or more of the secondary zones may not include a sensor. In such a situation, a data table may be stored in computer readable memory associated with, or in communication with, the at least one controller. The data table may have stored therein signal data for the secondary control signals to be delivered to the at least one secondary actuator. The data table may include tunable parameter data for the at least one secondary actuator, including, but not limited to, PID gains, feedback gains, lead/lag lag/lead gains, and the like, for example. It should be understood that any suitable type of tunable parameter data, such as that discussed above, may be stored in the data table.

The haptic effect may also be detected within the primary zone by at least one primary sensor located in the primary zone, where the at least one primary sensor is also in communication with the at least one controller. The at least one primary sensor may be used, in conjunction with the at least one controller, to generate feedback-based control signals for the primary actuator, where primary control signals are generated by the at least one controller to selectively tune the primary actuator. Similar to the secondary control signals, the primary control signals may utilize any suitable type of tuning or tunable parameters to control the output of the primary actuator in generation of the haptic effect. As a non-limiting example, tuning may be performed at the controller level, with further tuning taking place at the next process level, such as, for example, tuning of the gains (or any other suitable type of tunable parameter), tuning of the equations used by the controller, or selecting a different controller with different equations and/or gains. Non-limiting examples of tunable gains include, but are not limited to, proportional-integral-derivative (PID) gains, feedback gains, compensator gains and the like.

The at least one secondary zone may include secondary zones which are directly adjacent to the primary zone or which are spaced apart therefrom by intervening zones. As a further alternative, the at least one secondary zone may include a frame around (e.g., bounding) one or more portions of at least the primary zone, and the at least one secondary actuator may include a frame actuator located within the frame.

In addition to the suppression of unwanted haptic effects in secondary zones, the same arrangements of actuators and sensors may be extended to generating a standing wave interference pattern in the user interface to create a localized haptic effect at a target location while causing only substantially imperceptible haptic effects in areas outside of the target location. Thus, the at least one secondary actuator may be selectively actuated to generate a localizing effect within the primary zone, where the localizing effect is selectively controllable to localize the haptic effect within the primary zone through constructive and/or destructive interference between the localizing effect and the haptic effect within the primary zone. In aspects, constructive interference may be used to magnify the amplitude of a haptic effect.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
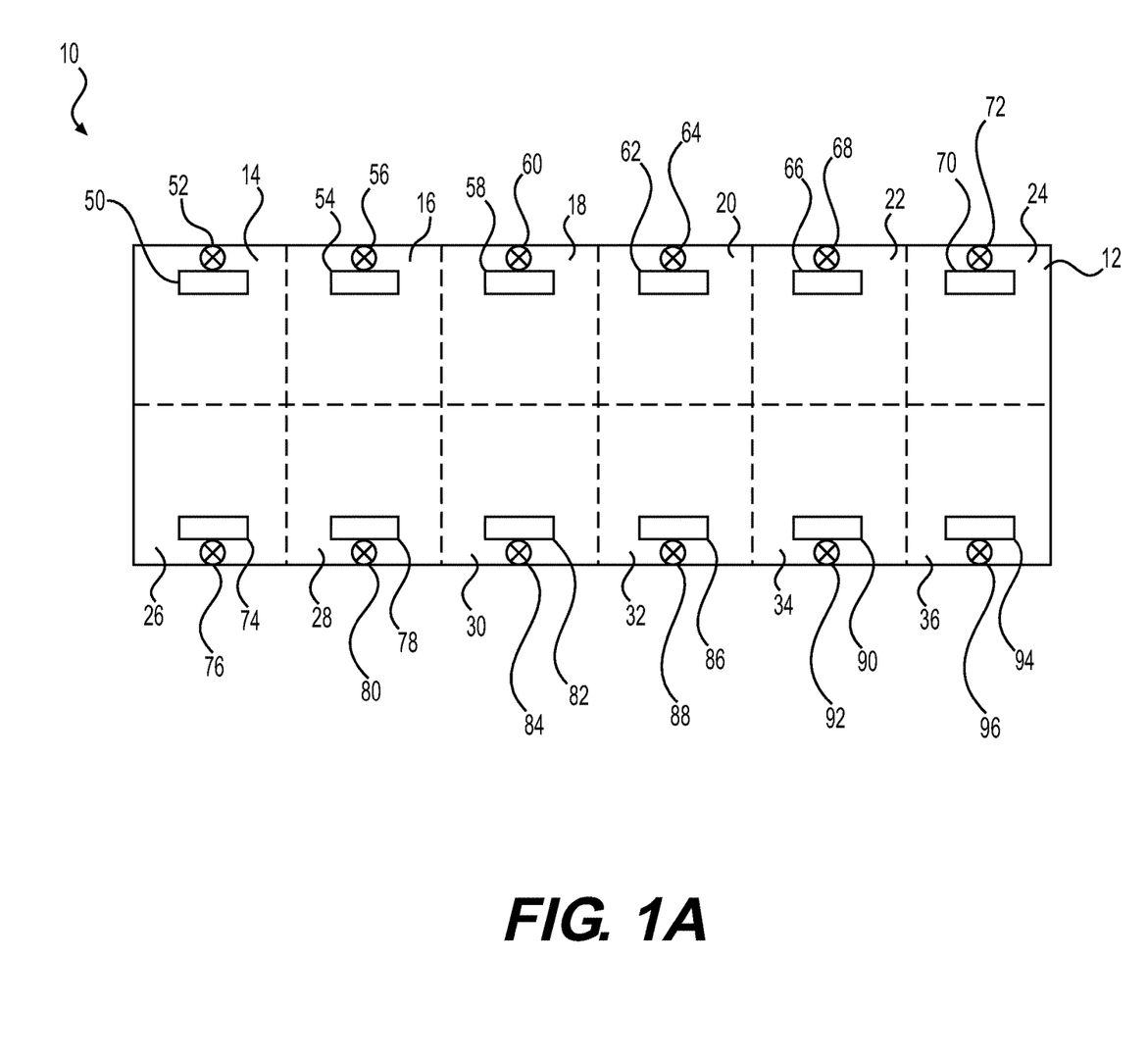
FIG. 1A diagrammatically illustrates a system for localizing one or more effects in a haptic interface in accordance with aspects.

Referring now to FIG. 1A, the system for localizing one or more effects in a haptic interface 10 is used with a user interface 12 having a primary zone and at least one secondary zone. In the non-limiting example of FIG. 1A, user interface 12, which may be a touch surface or the like, is shown divided into twelve zones 14, 16, 18, 20, 22, 24, 26, 28, 30, 32, 34 and 36. In aspects, the user interface 12 may be a continuous surface or plate. Alternatively, the user interface 12 may be a surface or plate with multiple segmented zones. It should be understood that the particular number of zones shown in FIG. 1A, as well as their generally rectangular shapes, are shown for exemplary purposes only, and that the user interface 12 may be divided into any suitable number of zones having any suitable shape or relative dimensions. It should be further understood that although user interface 12 is shown as a simplified rectangular touch surface panel in FIG. 1A, this representation of user interface 12 is shown for purposes of illustration and non-limiting example only, and user interface 12 may be any suitable type of interface to which haptics are applied, and may have any suitable shape and relative dimensions, including two-dimensional surfaces, three-dimensional surfaces, curved surfaces and/or the like. It should be further understood that user interface 12 may be any suitable type of user interface, such as, but not limited to, those integrated into automotive control panels, automotive infotainment systems, tablets, computer displays, laptop computers, smartphones, phablets, gaming consoles, handheld gaming devices, televisions, and/or interactive signs, as well as controllers, such as triggers, buttons, joysticks, joypads and/or the like, which permit a user to interact with a computer or computerized system.

In FIG. 1A, each of zones 14, 16, 18, 20, 22, 24, 26, 28, 30, 32, 34 and 36 is shown with a corresponding actuator and sensor, where the sensor is positioned adjacent the actuator. It should be understood that the single sensor and actuator pair of each zone, the relative positions of the sensor and actuator in each zone, and the positioning within each zone of the corresponding sensor and actuator are each shown for exemplary purposes only. As will be described below, FIGS. 2A-2E show other non-limiting examples of zone/sensor/actuator configurations. In the non-limiting example of FIG. 1A, zone 14 includes actuator 50 and sensor 52; zone 16 includes actuator 54 and sensor 56; zone 18 includes actuator 58 and sensor 60; zone 20 includes actuator 62 and sensor 64; zone 22 includes actuator 66 and sensor 68; zone 24 includes actuator 70 and sensor 72; zone 26 includes actuator 74 and sensor 76; zone 28 includes actuator 78 and sensor 80; zone 30 includes actuator 82 and sensor 84; zone 32 includes actuator 86 and sensor 88; zone 34 includes actuator 90 and sensor 92; and zone 36 includes actuator 94 and sensor 96.

It should be understood that any suitable type of actuators may be utilized. Non-limiting examples of such actuators include thin film actuators (e.g., macro-fiber composite (MFC) actuators), piezoelectric material actuators, smart material actuators, electro-polymer actuators, inertial or kinesthetic actuators, eccentric rotating mass (ERM) actuators, linear resonant actuators (LRAs), vibrotactile actuators, shape memory alloy actuators, electromechanical vibrators, solenoids, voice coil motors (VCMs) and the like, as well as combinations thereof. Similarly, it should be understood that any suitable type of sensors may be utilized. Non-limiting examples of such sensors include accelerometers, Hall effect sensors, optical sensors, position sensors, gyroscopes, for sensors, strain gauges, load cells and the like.

As a non-limiting example, zone 20 may be selected to be the primary zone; e.g., at a particular time, zone 20 will be, for example, the only active zone, producing a haptic effect via primary actuator 62. When the desired haptic effect is generated by primary actuator 62 within primary zone 20, the system for localizing one or more effects in a haptic interface 10 is used to suppress unwanted resultant haptic effects in at least one secondary zone. The at least one secondary zone may include one or more of directly adjacent zones 18, 22, 30, 32, 34 and/or one or more of non-adjacent zones 14, 16, 24, 26, 28, 36.

The system for localizing one or more effects in a haptic interface 10 may be operated in different modes. For example, haptic effect suppression may be applied to a first set of zones (e.g., only to the directly adjacent zones 18, 22, 30, 32, 34 (in the above example)) in a first mode, and may be applied to a second set of zones (e.g., to all secondary zones 14, 16, 18, 22, 24, 26, 28, 30, 32, 34, 36) in a second mode. The control parameters for haptic effect suppression (as will be discussed in detail below) may be set according to proximity to the primary zone 20.

Figure 1B:
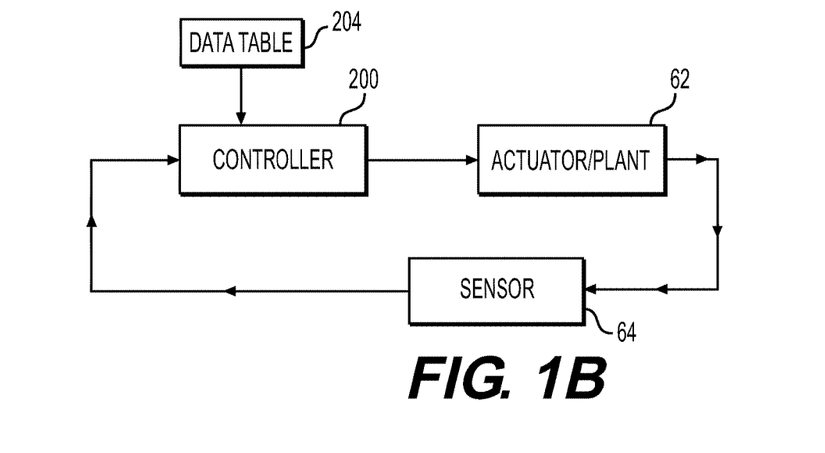
FIG. 1B is a block diagram illustrating feedback-based control in a primary zone of the system for localizing one or more effects in a haptic interface in accordance with aspects.

As illustrated in FIG. 1B, a controller 200 is in communication with primary actuator 62 in the non-limiting example where zone 20 is the primary zone. In FIG. 1B, the term "plant" is associated with actuator 62; the word "plant" in this context is used to describe the combination or interface between the actuator 62 and the screen (or other surface or mechanism to which actuator 62 transmits haptic effects) of user interface 12. It should be understood that controller 200 may be any suitable type of controller, such as a processor, programmable logic controller, a proportional-integral-derivative (PID) controller, control circuitry or the like. Controller 200 includes, or is in communication with, a signal generator for generating actuation signals to selectively control actuator 62 to generate a desired haptic effect within primary zone 20.

Figure 1C:
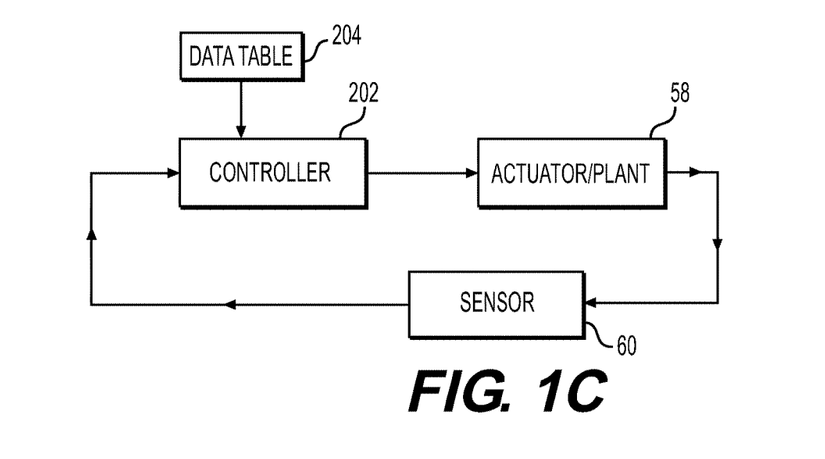
FIG. 1C is a block diagram illustrating control in a secondary zone of the system for localizing one or more effects in a haptic interface in accordance with aspects.

In FIG. 1C, adjacent zone 18 is used as the secondary zone, although it should be understood that each of zones 14, 16, 18, 20, 22, 24, 26, 28, 30, 32, 34 and 36 has a similar configuration, and that only the single secondary zone 18 is discussed herein for purposes of simplification. The secondary actuator 58 of secondary zone 18 in this non-limiting example is also in communication with a controller 202, which may be a separate controller from controller 200, may be the same controller, or controllers 200 and 202 may be sub-systems of a master controller. In this non-limiting example, when controller 200 selectively and controllably drives primary actuator 62 to generate a haptic effect in the primary zone 20, unwanted haptic effects may be transmitted through the user interface 12 into one or more of directly adjacent zones 18, 22, 30, 32, 34 and/or one or more of non-adjacent zones 14, 16, 24, 26, 28, 36.

In the present simplified non-limiting example, secondary sensor 60 is in communication with controller 202, as shown in FIG. 1C, for detecting the haptic effect generated by primary actuator 62; e.g., secondary sensor 60 detects if any unwanted haptic effects have been transmitted into adjacent secondary zone 18 from primary zone 20, where the haptic effect is generated and desired. If the haptic effect is detected in secondary zone 18 by secondary sensor 60, then controller 202 selectively and controllably actuates the secondary actuator 58 within secondary zone 18 to generate a suppression effect within secondary zone 18. The suppression effect is selectively controlled by controller 202 to suppress the haptic effect within the secondary zone 18 through destructive interference between the suppression effect and the haptic effect within secondary zone 18.

Controller 202 generates secondary control signals for the secondary actuator 58 based on feedback from the secondary sensor 60 located in the secondary zone 18; e.g., based on feedback from the secondary sensor 60, the controller 202 is able to selectively and controllably tune the suppression effect being generated by the secondary actuator 58 to suppress the haptic effect. It should be understood that any suitable type of tuning may be used to control the output of the secondary actuator 58 in generation of the suppression effect. As a non-limiting example, tuning may be performed at the controller level, with further tuning taking place at the next process level, such as, for example, tuning of the gains (or any other suitable type of tunable parameter), tuning of the equations used by the controller, or selecting a different controller with different equations and/or gains. Non-limiting examples of tunable gains include, but are not limited to, proportional-integral-derivative (PID) gains, feedback gains, compensator gains and the like.

Alternatively, one or more of the secondary zones may not include a sensor. In such a situation, a data table 204 may be stored in computer readable memory associated with, or in communication with, the controller 202. The data table 204 may have stored therein signal data for the secondary control signals to be delivered to the secondary actuator 58. The data table 204 may include tunable parameter data for the secondary actuator 58, including, but not limited to, PID gains, feedback gains, lead/lag lag/lead gains, and the like. It should be understood that any suitable type of tunable parameter data, such as that discussed above, may be stored in the data table.

Returning to FIG. 1B, the haptic effect may similarly be detected within the primary zone 20 by the primary sensor 64. The primary sensor 64 is also in communication with controller 200. The primary sensor 64 may be used, in conjunction with the controller 200, to generate feedback-based control signals for the primary actuator 62, where primary control signals are generated by controller 200 to selectively tune the primary actuator 62, allowing for feedback-based quality control over the haptic effect being generated within the primary zone 20. Using this feedback-based technique, haptic fidelity within primary zone 20 may be improved through real-time monitoring thereof by primary sensor 64. Similar to the secondary control signals, the primary control signals may utilize any suitable type of tunable parameter to control the output of the primary actuator 62 in generation of the haptic effect. As a non-limiting example, tuning may be performed at the controller level, with further tuning taking place at the next process level, such as, for example, tuning of the gains (or any other suitable type of tunable parameter), tuning of the equations used by the controller, or selecting a different controller with different equations and/or gains. Non-limiting examples of tunable gains include, but are not limited to, proportional-integral-derivative (PID) gains, feedback gains, compensator gains and the like. As a further alternative, the primary zone 20 may not include a sensor. In such a situation, the data table 204 may have stored therein signal data for the primary control signals to be delivered to the primary actuator 62. The data table 204 may include any suitable type of tunable parameter data for the primary actuator 62.

As noted above, the arrangement of zones 14, 16, 18, 20, 22, 24, 26, 28, 30, 32, 34 and 36 in FIG. 1A is shown for exemplary purposes only. In the non-limiting example of FIG. 1A, each of zones 14, 16, 18, 20, 22, 24, 26, 28, 30, 32, 34 and 36 includes a single actuator and a single sensor, where the actuator and sensor within each zone are positioned adjacent one another, and each horizontal array of zones has aligned actuator-sensor pairs. However, the system for localizing one or more effects in a haptic interface 10 may be adapted to a wide variety of applications, thus requiring variation in the arrangement of the actuators, sensors and/or the zones themselves. For example, a control panel for one particular type of vehicle may require a particular arrangement of virtual buttons and/or virtual sliders, thus requiring a matching arrangement of actuators, sensors and zones. However, a different type of vehicle, or a touch panel control for an entirely different application, may require an entirely different arrangement of virtual buttons and/or virtual sliders, thus requiring a correspondingly different arrangement of actuators, sensors and zones. Thus, it should be understood that the number, positioning, shapes and relative sizes of the zones may be varied, and the number and location of the actuators and sensors included within each zone (including zones without an actuator and/or sensor) may be varied.

Figure 2A:
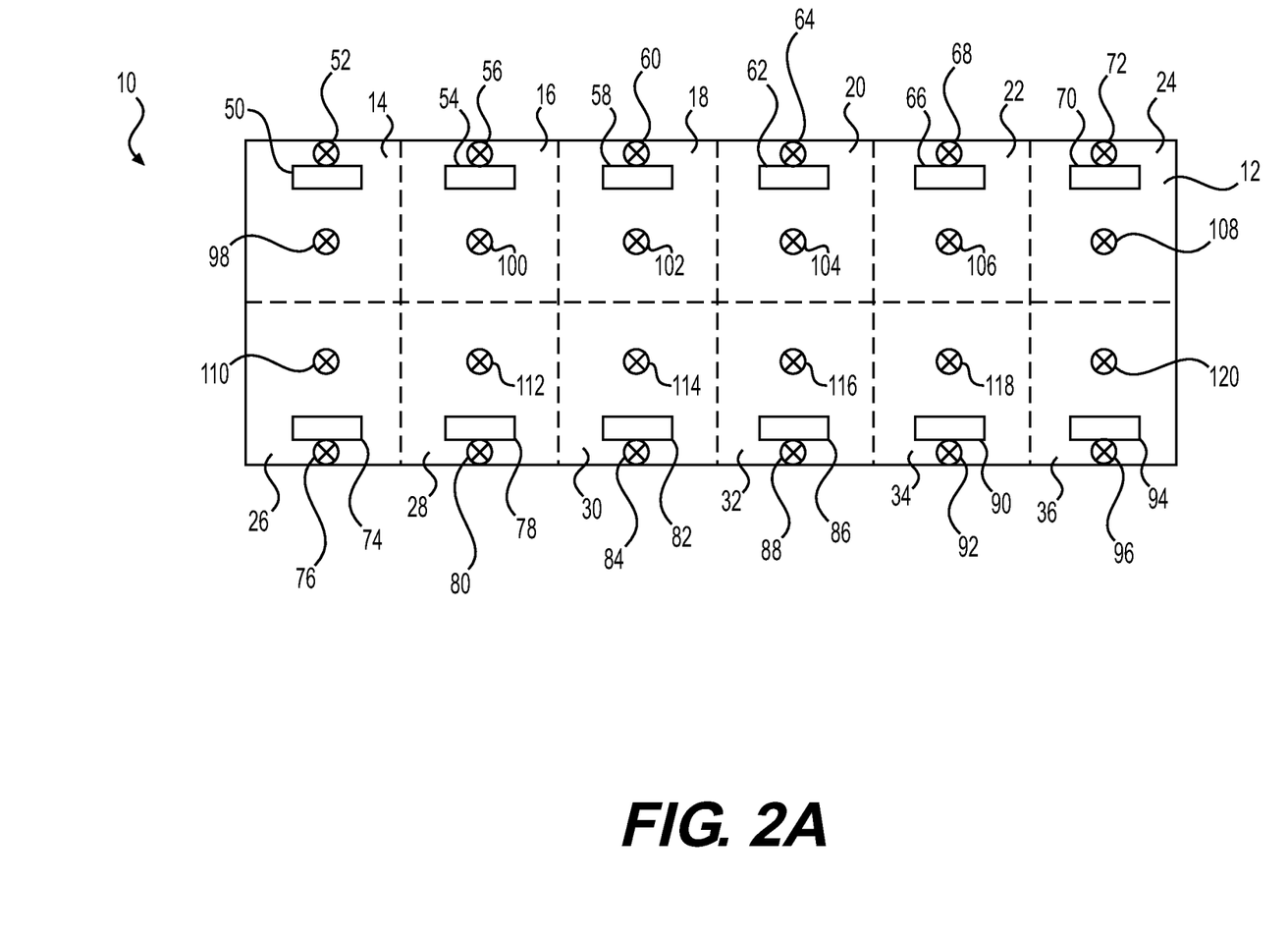
FIG. 2A diagrammatically illustrates an alternative configuration of the system for localizing one or more effects in a haptic interface in accordance with aspects.

FIG. 2A illustrates another non-limiting example showing the addition of a second sensor within each zone; e.g., each of zones 14, 16, 18, 20, 22, 24, 26, 28, 30, 32, 34 and 36 includes a second sensor 98, 100, 102, 104, 106, 108, 110, 112, 114, 116, 118 and 120, respectively. It should be understood that each zone may include any suitable number of sensors, each in communication with the corresponding controller of the zone. In FIG. 2A, each of sensors 98, 100, 102, 104, 106, 108, 110, 112, 114, 116, 118, 120 is positioned approximately central to the corresponding zone and is spaced apart from its corresponding actuator. It should be understood that the sensors of each zone may be positioned at any suitable location therein, and may have any suitable positioning relative to the corresponding actuator. In FIG. 2A, in zone 14, as an example, two sensors 52 and 98 are provided. For purposes of haptic effect suppression in zone 14, sensor 52 may be selected for increasing (e.g., optimizing) haptic effect suppression due to its proximity to actuator 50; e.g., measurement at the actuation point may be considered an optimal condition for providing the feedback signals.

Figure 2B:
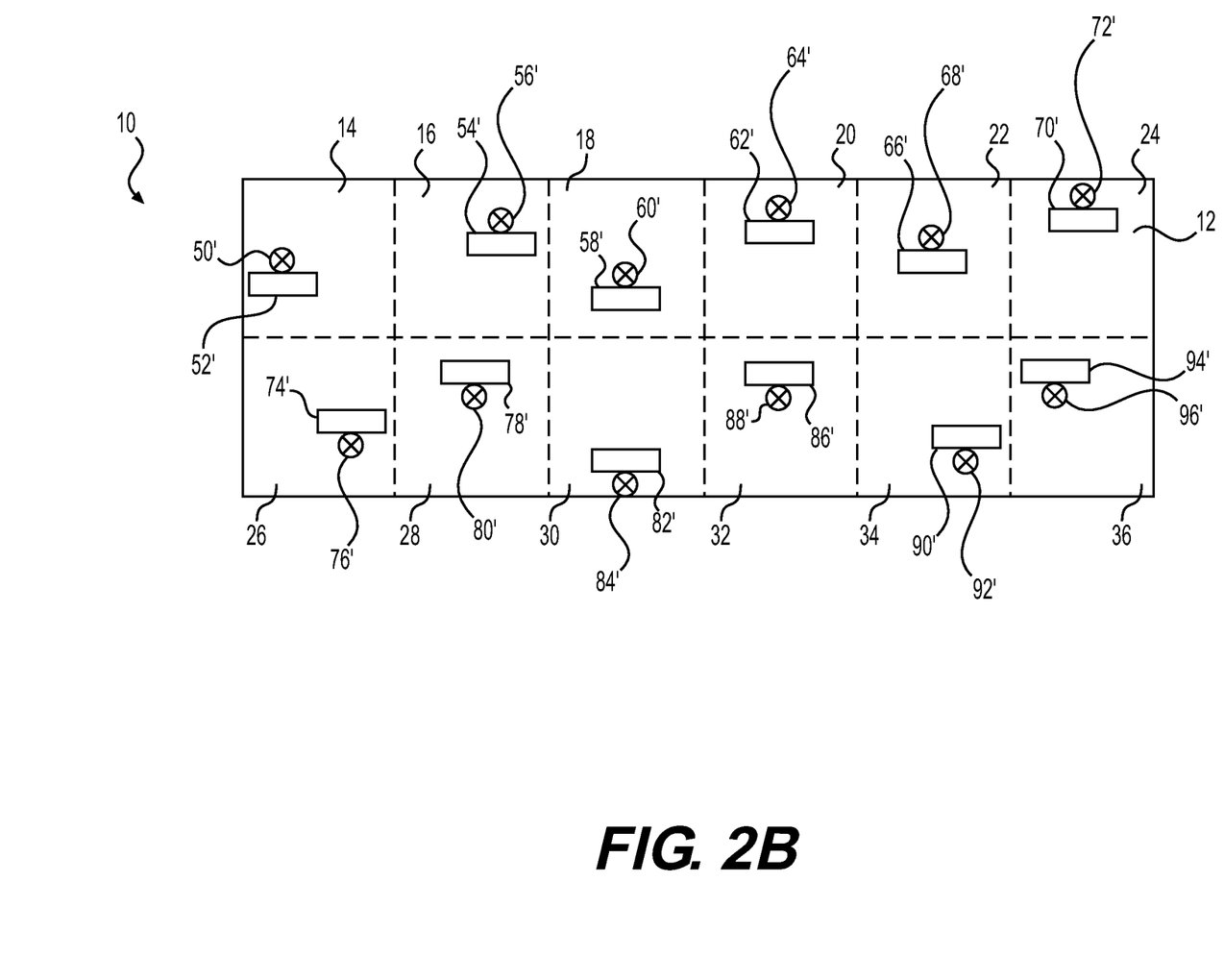
FIG. 2B diagrammatically illustrates another alternative configuration of the system for localizing one or more effects in a haptic interface in accordance with aspects.

FIG. 2B illustrates another non-limiting example which is similar to that of FIG. 1A, but where each pair of sensors and actuators is located in a different location than in FIG. 1A. It should be understood that the sensors and actuators of each zone may be positioned at any suitable locations therein, and may have any suitable positioning relative to one another. In the non-limiting example of FIG. 2B, zone 14 includes actuator 52' and sensor 50'; zone 16, includes actuator 54' and sensor 56'; zone 18 includes actuator 58' and sensor 60'; zone 20 includes actuator 62' and sensor 64'; zone 22 includes actuator 66' and sensor 68'; zone 24 includes actuator 70' and sensor 72'; zone 26 includes actuator 74' and sensor 76'; zone 28 includes actuator 78' and sensor 80'; zone 30 includes actuator 82' and sensor 84'; zone 32 includes actuator 86' and sensor 88'; zone 34 includes actuator 90' and sensor 92'; and zone 36 includes actuator 94' and sensor 96'.

Figure 2C:
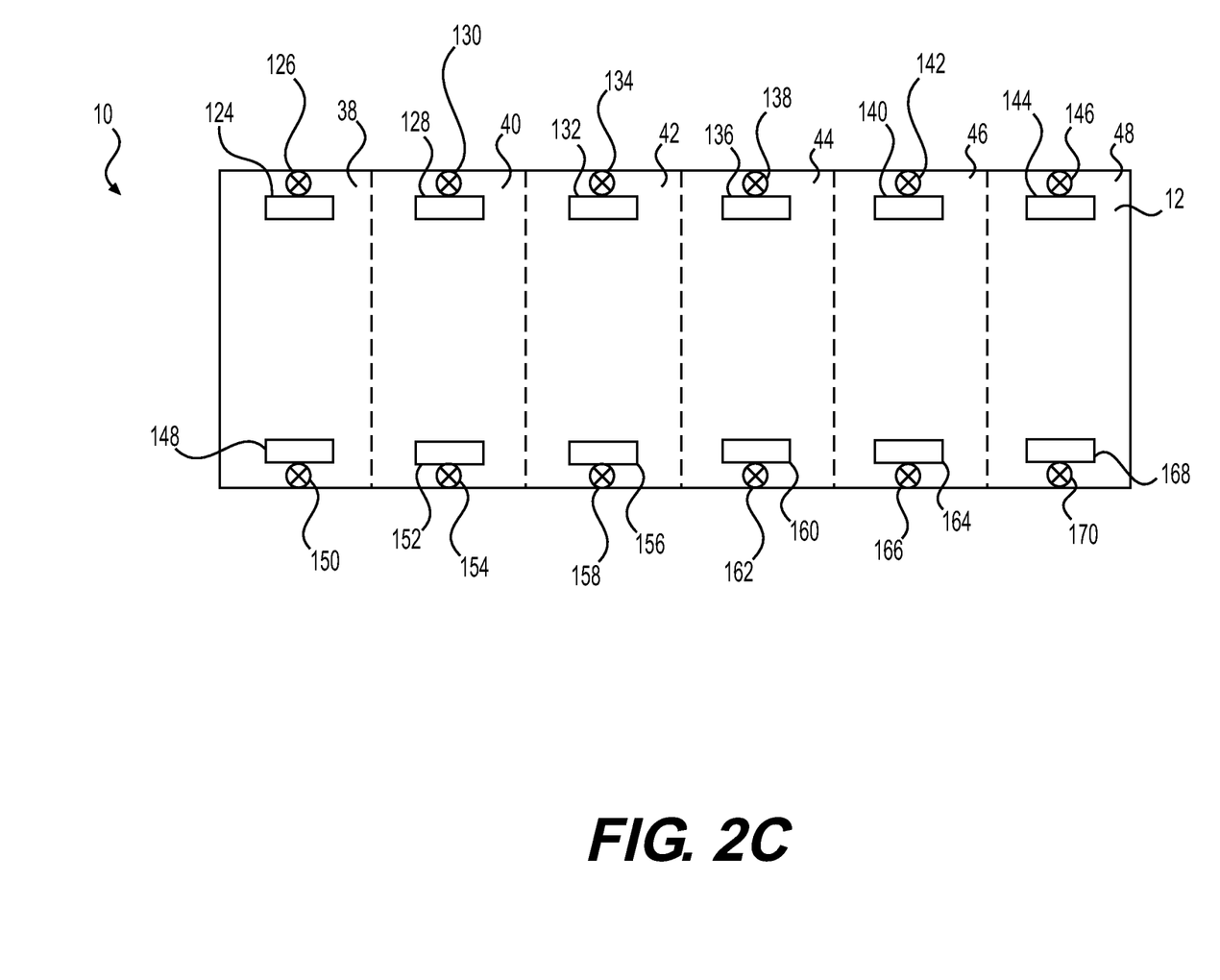
FIG. 2C diagrammatically illustrates still another alternative configuration of the system for localizing one or more effects in a haptic interface in accordance with aspects.

As noted above, it should be understood that the particular number of zones shown in FIG. 1A, as well as their general shapes, are shown for exemplary purposes only. FIG. 2C illustrates another non-limiting example where user interface 12 is divided into six zones 38, 40, 42, 44, 46, 48. Zone 38 includes a first actuator 124 and corresponding sensor 136, and a second actuator 148 and corresponding sensor 150; zone 40 includes a first actuator 128 and corresponding sensor 130, and a second actuator 152 and corresponding sensor 154; zone 42 includes a first actuator 132 and corresponding sensor 134, and a second actuator 156 and corresponding sensor 158; zone 44 includes a first actuator 136 and corresponding sensor 138, and a second actuator 160 and corresponding sensor 162; zone 46 includes a first actuator 140 and corresponding sensor 142, and a second actuator 164 and corresponding sensor 166; and zone 48 includes a first actuator 144 and corresponding sensor 146, and a second actuator 168 and corresponding sensor 170.

Figure 2D:
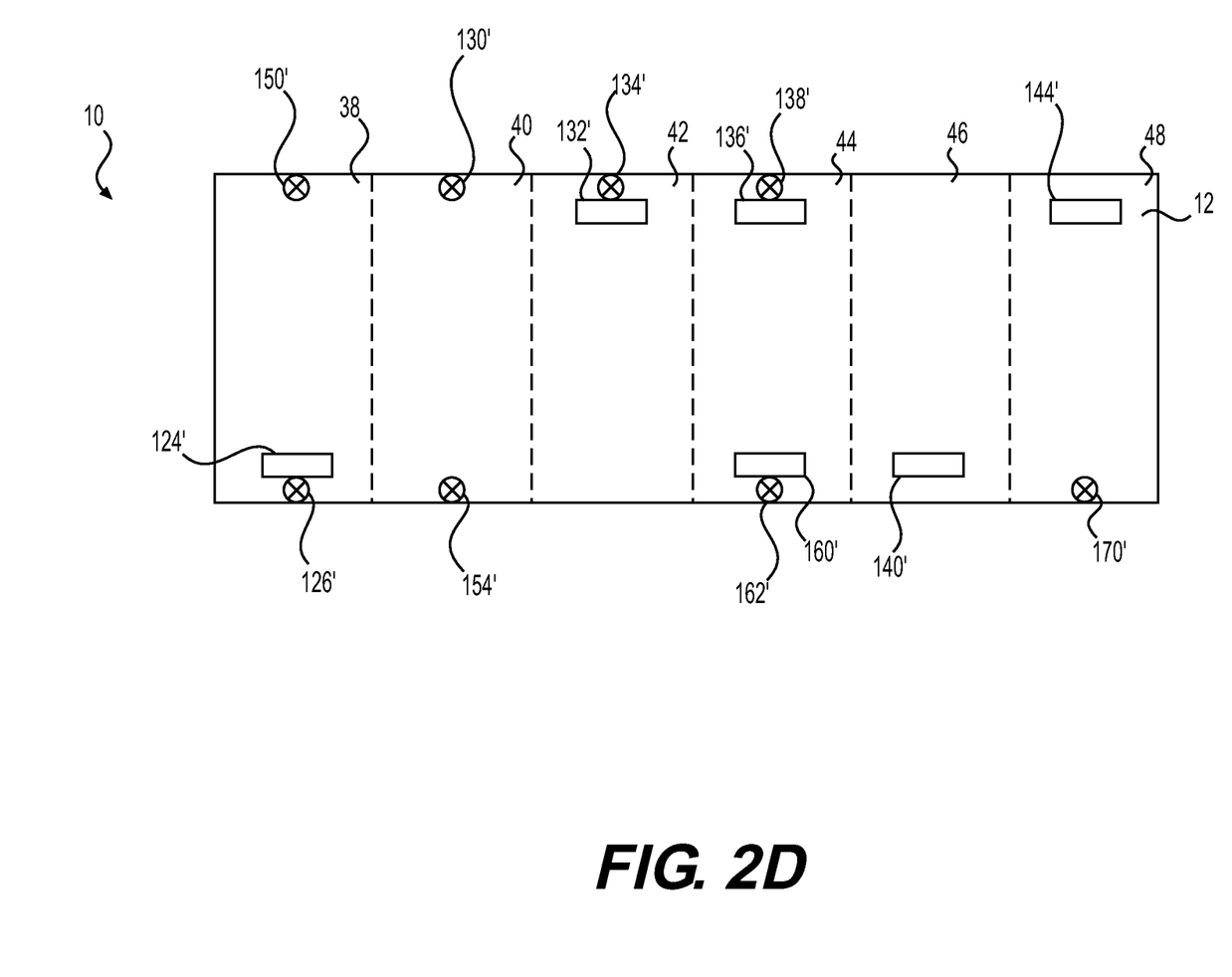
FIG. 2D diagrammatically illustrates yet another alternative configuration of the system for localizing one or more effects in a haptic interface in accordance with aspects.
Figure 2E:
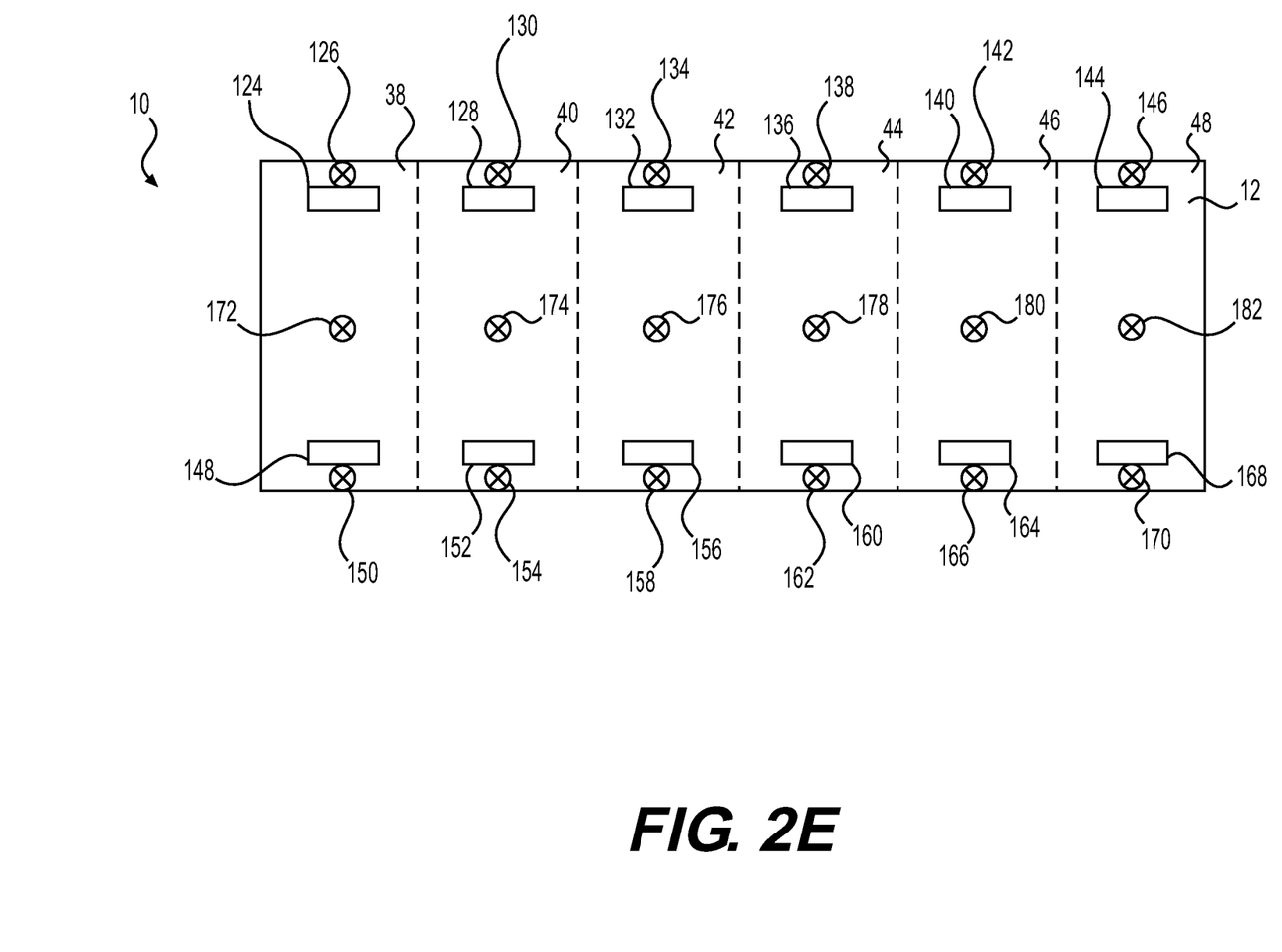
FIG. 2E diagrammatically illustrates a further alternative configuration of the system for localizing one or more effects in a haptic interface in accordance with aspects.

In the further non-limiting example of FIG. 2D, zone 38 includes a single actuator 124' and corresponding sensor 126', and a second sensor 150'; zone 40 includes only first and second sensors 130' and 154', respectively; zone 42 includes only a single actuator 132' and a single sensor 134'; zone 44 includes a first actuator 136' and corresponding sensor 138', and a second actuator 160' and a corresponding sensor 162'; zone 46 includes only a single actuator 140' with no additional sensor(s); and zone 48 includes an actuator 144' on one end of the zone (e.g., at the top in the orientation of FIG. 2D) and a sensor 170' positioned at the opposite end of the zone (e.g., at the bottom in the orientation of FIG. 2D). The non-limiting example of FIG. 2E is similar to the configuration of FIG. 2C, but zones 38, 40, 42, 44, 46 and 48 each contain a third sensor 172, 174, 176, 178, 180 and 182, respectively.

Figure 3A:
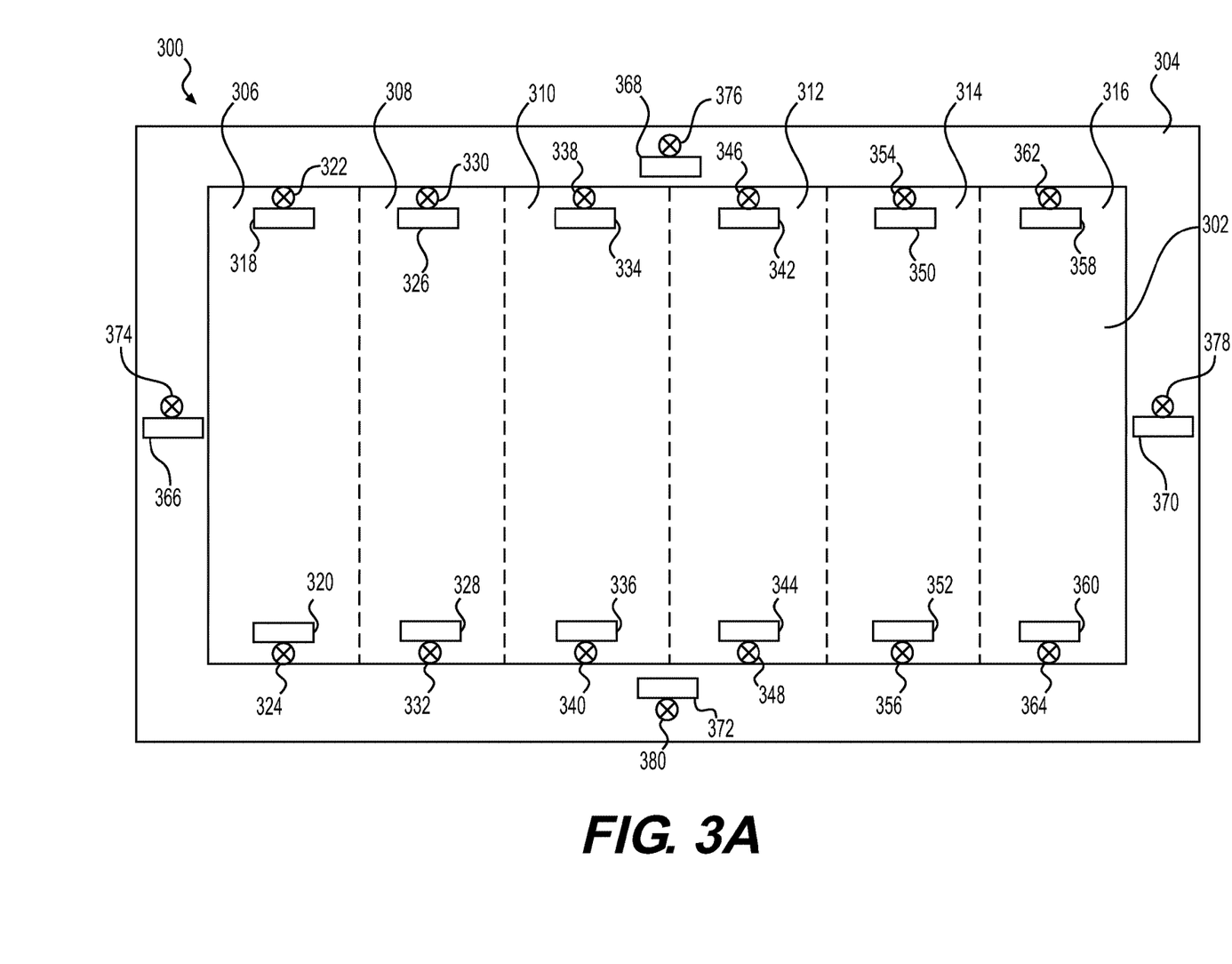
FIG. 3A diagrammatically illustrates an alternative embodiment of the system for localizing one or more effects in a haptic interface in accordance with aspects.

In the alternative system for localizing one or more effects in a haptic interface 300 shown in FIG. 3A, the user interface 302 is surrounded by a frame 304. Similar to the previous embodiments, the non-limiting example of FIG. 3A includes a user interface 302 which is divided into a plurality of zones 306, 308, 310, 312, 314 and 316. It should be understood that the shapes, relative dimensions and number of zones 306, 308, 310, 312, 314 and 316 shown in FIG. 3A are shown for exemplary purposes only. Similarly, it should be understood that the number and placement of sensors and actuators shown in FIG. 3A are shown for exemplary purposes only. In the non-limiting example of FIG. 3A, zone 306 includes actuators 318, 320 and sensors 322, 324; zone 308 includes actuators 326, 328 and sensors 330, 332; zone 310 includes actuators 334, 336 and sensors 338, 340; zone 312 includes actuators 342, 344 and sensors 346, 348; zone 314 includes actuators 350, 352 and sensors 354, 356; and zone 316 includes actuators 358, 360 and sensors 362, 364.

As in the previous embodiments, any of zones 306, 308, 310, 312, 314, 316 may be the primary zone, with the remainder of the zones each being a secondary zone. However, in the embodiment of FIG. 3A, frame 304 is also part of the secondary zones of system 300. As shown in FIG. 3A, frame 304 includes secondary actuators 366, 368, 370 and 372, and secondary sensors 374, 376, 378 and 380. It should be understood that the number and placement of sensors and actuators within the secondary zone defined by frame 304 are shown in FIG. 3A for exemplary purposes only. As in the previous embodiments, each of secondary actuators 366, 368, 370, 372 and secondary sensors 374, 376, 378, 380 is in communication with a controller such that they may be used in a manner similar to the secondary actuators and secondary sensors described above with respect to the previous embodiments; i.e., to suppress a haptic effect transmitted from the primary zone into the zone defined by frame 304. As a non-limiting example, the system for localizing one or more effects in a haptic interface 300 of FIG. 3A may be used as an in-dashboard automotive panel, such as a touch surface, control panel, display or the like, where user interface 302 is a viewable area of the in-dashboard automotive panel, and frame 304 is the dashboard mounting portion of the automotive panel. It should be understood that the usage of the system for localizing one or more effects in a haptic interface 300 as an automotive panel is discussed for non-limiting exemplary purposes only. It should be further understood that the discussion of dashboard mounting is similarly for non-limiting exemplary purposes only. As further non-limiting examples, such panels may be mounted on doors, in a center console area, on the steering wheel, etc.

Figure 3B:
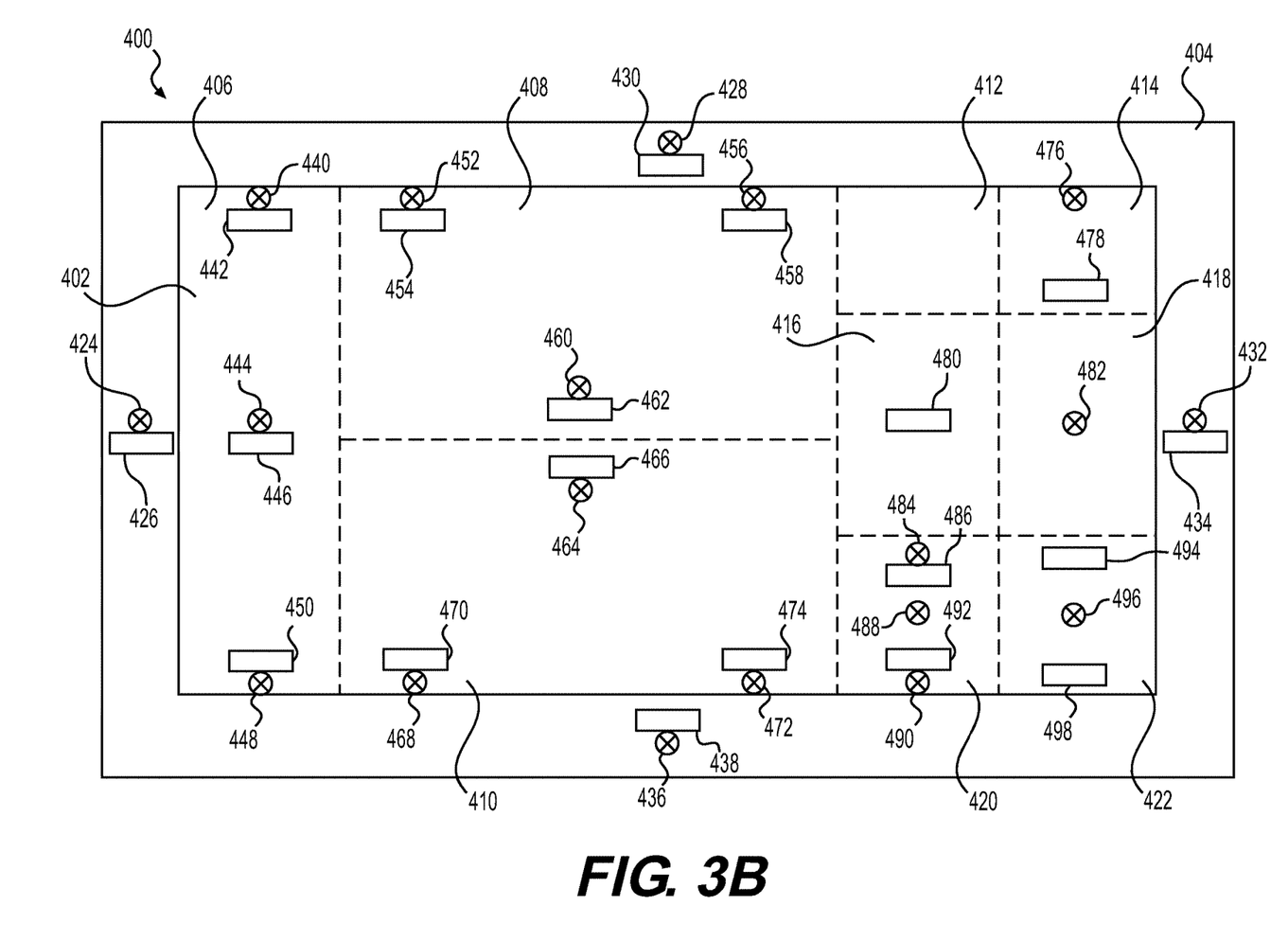
FIG. 3B diagrammatically illustrates another alternative embodiment of the system for localizing one or more effects in a haptic interface in accordance with aspects.

As discussed above, the arrangement of the zones, and the arrangements and numbers of sensors and actuators within each zone, is shown and described in the previous embodiments for exemplary purposes only. In the above embodiments, both the zones and the corresponding arrangement and numbers of sensors and actuators within each zone are substantially regular, following regular geometric patterns. It should be understood that these arrangements have been shown for exemplary and illustrative purposes only. As noted above, the system for localizing one or more effects in a haptic interface may be adapted to a wide variety of applications, thus requiring variation in the arrangement and number of the actuators, sensors and the zones. The non-limiting example of FIG. 3B shows a less regular arrangement of zones, sensor and actuators as non-limiting example of such variation. In FIG. 3B, the system for localizing one or more effects in a haptic interface 400 is similar to that of FIG. 3A, in that it includes a user interface 402 surrounded by a frame 404, with frame 404 including secondary actuators 426, 430, 434 and 438, and secondary sensors 424, 428, 432 and 436.

Whereas zones 306, 308, 310, 312, 314, 316 of the embodiment of FIG. 3A are arranged in a simple horizontal array, in the non-limiting example of FIG. 3B, zones 406, 408, 410, 412, 414, 416, 418, 420 and 422 are shown with differing sizes and are arranged asymmetrically. It should be understood that this particular arrangement is shown as a non-limiting example of the differing sizes, shapes and arrangements of zones which are possible. Similarly, the non-limiting example of the arrangement of sensors and actuators within each zone is more varied than in the previous examples.

Within zone 406, sensor-actuator pair 440, 442 and sensor-actuator pair 448, 450 are shown at opposed ends of zone 406, with sensor-actuator pair 444, 446 positioned substantially centrally. In zone 408, sensor-actuator pair 452, 454 and sensor-actuator pair 456, 458 are shown at opposed upper corners of zone 408, with sensor-actuator pair 460, 462 positioned substantially centrally (e.g., in the horizontal direction), and adjacent the lower end of zone 408. An opposite arrangement is shown within zone 410, with sensor-actuator pair 468, 470 and sensor-actuator pair 472, 474 shown at opposed upper lower of zone 410, and with sensor-actuator pair 464, 466 positioned substantially centrally (e.g., in the horizontal direction), and adjacent the upper end of zone 410. Zone 412 is shown having no sensor or actuator. In zone 414, sensor 476 is spaced apart from actuator 478. It should be understood that the sensors and actuators are not required to be provided in adjacent pairs in any of the previous embodiments.

Additionally, individual unpaired sensors or actuators may be located within a zone. For example, zone 416 includes only an actuator 480, and zone 418 includes only a sensor 482. Zone 420 is shown having a sensor-actuator pair 484, 486 and a sensor-actuator pair 490, 492 at opposed upper and lower ends of zone 420, respectively, with an unpaired sensor 488 positioned therebetween. Within zone 422, single actuators 494, 498 are located at opposed upper and lower ends of zone 422, within a single sensor 496 positioned therebetween.

In each of the embodiments discussed above, the actuators and sensors in each zone have been discussed solely with regard to the suppression of unwanted haptic effects in secondary zones. However, with the same arrangement of actuators and sensors, functionality may be extended to generating a standing wave interference pattern in the user interface 12 to create a localized haptic effect at a target location while causing, for example, only substantially imperceptible haptic effects in areas outside of the target location. Thus, the at least one secondary actuator may be selectively actuated to generate a localizing effect within the primary zone, where the localizing effect also has a set of localizing parameters associated therewith, which are selected to localize the haptic effect within the primary zone through at least one of constructive interference and destructive interference between the localizing effect and the haptic effect within the primary zone. As an example, in FIG. 4A, which utilizes the same arrangement shown in FIG. 1A, the dashed circle positioned midway between zones 18 and 20 represents a desired location for a localized haptic effect. It should be understood that the choice of the arrangement of FIG. 1A and the particular targeted location are shown for exemplary purposes only. Using a technique similar to that discussed above with regard to the previous embodiments, for a haptic effect having desired parameters at any location on user interface 12, the parameters for generating this haptic effect using combinations of the actuators can be tuned in a similar manner such that selected actuators are controlled to generate a standing wave which would result in the desired effect at the desired location.

Figure 4A:
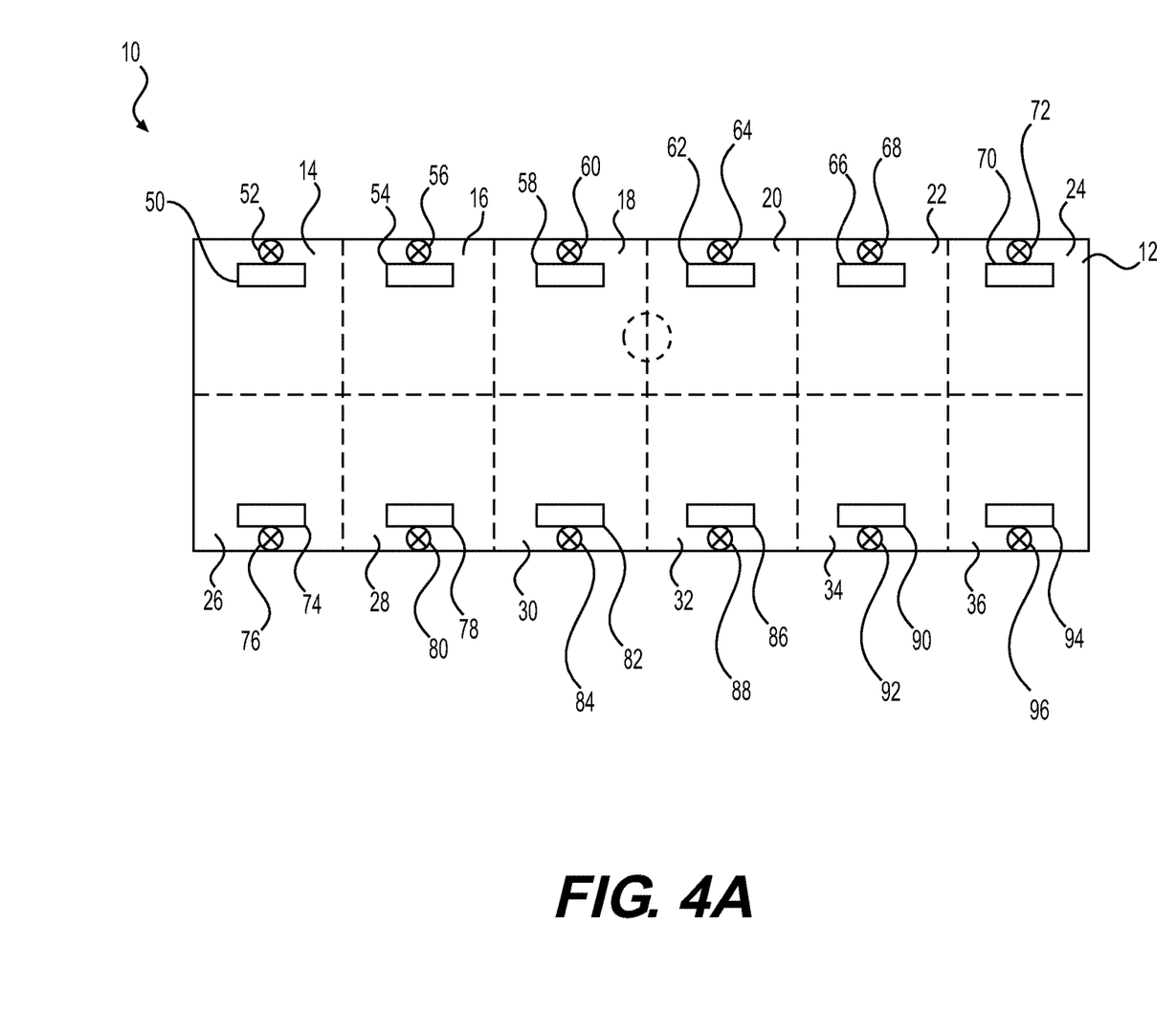
FIG. 4A and FIG. 4B each diagrammatically illustrate localization of haptic effects using the system for localizing one or more effects in a haptic interface in accordance with aspects.
Figure 4B:
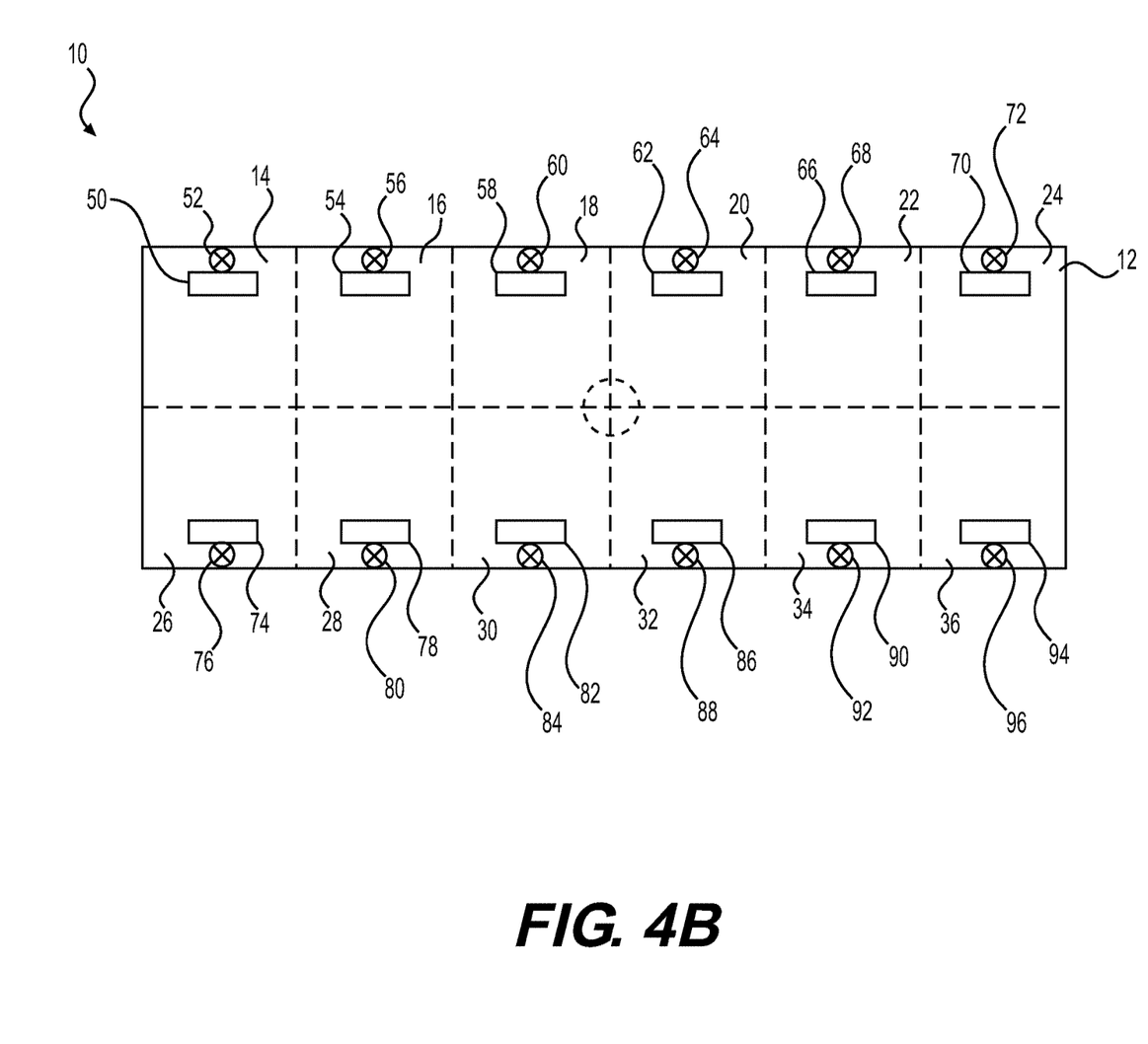

For example, actuators 58 and 62 may be actuated, each with the appropriate tunable gains, to create a highly localized haptic effect at the position indicated in FIG. 4A, where the localized haptic effect is the result of a standing wave interference pattern. FIG. 4B illustrates another example, where the desired location of a haptic effect is positioned centrally between zones 18, 20, 30 and 32. As an example, actuators 58, 62, 82 and 86 may be actuated, each with the appropriate tunable gains, to create a highly localized haptic effect at the position indicated in FIG. 4B. By activating one or more of the actuators with the appropriately controlled parameters, the controller 200 can generate a number of standing waves that, together, form a standing wave interference pattern. The standing wave interference pattern can be shaped by the controller 200 to produce localized haptic effects at any specific target locations. As in the previous embodiments, it should be understood that any suitable type of tuning may be used to control the output of the actuator(s) in generation of the highly localized effect. As a non-limiting example, tuning may be performed at the controller level, with further tuning taking place at the next process level, such as, for example, tuning of the gains (or any other suitable type of tunable parameter), tuning of the equations used by the controller, or selecting a different controller with different equations and/or gains. Non-limiting examples of tunable gains include, but are not limited to, proportional-integral-derivative (PID) gains, feedback gains, compensator gains and the like.

Using a similar technique, in addition to localizing haptic effects through constructive and/or destructive interference, constructive interference may be used to magnify the amplitude of a haptic effect. As a non-limiting example, in FIG. 1A, if actuators 54 and 78 in zones 16 and 28, respectively, are each driven to produce a vibrational haptic effect with an amplitude of A, at least the phase of one of the vibrational haptic effects with respect to the other may be adjusted such that a point midway between actuators 54 and 78 has an amplitude up to 2 A (e.g., through additive constructive interference between the two vibrational haptic effects). In this simplified example, the midway point between the two actuators has a magnified amplitude of up to 2 A, however, it should be understood that in a manner similar to that described above with respect to producing localized haptic effects, two or more actuators may be activated at specific frequencies, amplitudes and/or phases to produce a haptic effect having a desired amplitude (or particular waveform) at any location within the display of user interface 12.

In this manner, one or more haptic effects may be localized on a continuous large surface or plate, or on a surface or plate with multiple segmented zones. In aspects, localized haptics in this context may be defined as having a haptic effect be predominantly played on specifically defined zones (e.g., or portions) of the surface or plate. One or more of the zones may have an associated actuator and associated measurement (e.g., acceleration, position, and/or the like). In aspects, the surface or plate is divided into a fixed number of zones, one or more of which including an associated actuator and an accelerometer. To create a localized haptic effect on a specific chosen zone, a haptic effect is played on that zone. In aspects, to achieve high fidelity (e.g., sharp) effects, a controller employs Active Sensing Technology (AST) from Immersion Corporation to control the actuator that is covering the zone where the effect is desired to be played. In aspects, active vibration suppression is used on regions that are adjacent to the driven region to reduce and/or minimize the haptic effect in the adjacent zones. In this manner, one or more actuators generate vibrations that actively counter the propagating undesirable haptic effects.

In aspects, a zone may have one or more associated actuators. In aspects, one or more measurements (e.g., acceleration, position, etc.) may, for example, be sensed by a sensor and/or associated with a zone. In aspects, actuators can be placed anywhere on the surface or plate. In aspects, if more than one measurement is associated with a zone, then a measurement made closer to the actuator may be used for the vibration suppression. In aspects, for improved (e.g., optimum) vibration suppression, a measurement at or nearest the actuation point is desired.

In aspects, to improve (e.g., optimize) the performance of the system, zones can be categorized, for example, into three types based on the haptic effect and/or localization goal. A driven zone is where haptic effect is played (e.g., with or without AST). An adjacent zone (e.g., relative to the driven zone) may employ or provide high-gain haptic effect (e.g., vibration) suppression. A non-adjacent zone (e.g., relative to the driven zone) may or may not provide haptic effect (e.g., vibration) suppression. In aspects, only the zones adjacent to the driven zone require, employ and/or provide vibration suppression. In aspects, all the non-driven zones may employ and/or provide active vibration suppression. In aspects, parameters of the haptic effect (e.g., vibration) suppression controller may be based on (e.g., set according to) the proximity of a particular zone providing suppression to the driven zone. In aspects, a larger or smaller and/or different categorization of zones may be employed.

In aspects, when driving a single actuator in a zone the haptic effect may be at a maximum at the actuator location and may diminish as you spatially move from the actuator. In aspects, a larger (e.g., maximum) haptic effect may be located at a zone between two of the segments. In aspects, one or more haptic effects with a set magnitudes and phases, respectively, may be employed to position the desired peak location at central region (e.g., a midpoint) between two or among four zones. In general, such an interpolation approach may be implemented to achieve larger acceleration at a specific inter-zonal location or intra-zonal location of the continuous surface by driving one or more (e.g., multiple) zones with lower magnitudes and predetermined phases, respectively.

As described above, a haptic device when activated often create undesirable vibrations that propagate from the device to other areas surrounding the haptic device. For example, vibrations from an active haptic touch screen in a central control panel of a car may propagate to the frame of the device and create undesirable vibrations in the surrounding area. The present methods and apparatus may suppress these unwanted vibrations by employing a vibration suppression mechanism (e.g., sensor and/or actuator) attached to the frame. When a haptic effect is played by the touchscreen the vibration suppression mechanism will employ the haptic effect (e.g., vibration) suppression controller and reduce and/or minimize any haptics propagating from the frame of the device to the rest of the car. In this example, the frame could be on a secondary suspension or mechanically grounded to the body of the car. In aspects, these methods and apparatus may be generalized to any haptic device, such as a touch screen, touchpad, joystick, and/or the like. In aspects, the frame vibration system could be in a modular unit with actuator and sensor, which may be placed at specific areas where vibration suppression is needed.

It is to be understood that the apparatus and methods for localizing one or more effects in a haptic interface is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of localizing one or more effects in a haptic interface, comprising:
   generating a haptic effect with a primary actuator in a primary zone of a user interface, wherein the user interface includes the primary zone and at least one secondary zone;
   detecting the haptic effect generated by the primary actuator within the at least one secondary zone using at least one secondary sensor located in the at least one secondary zone; and
   actuating at least one secondary actuator within the at least one secondary zone to generate a suppression effect to suppress the haptic effect generated by the primary actuator within the at least one secondary zone upon detection of the haptic effect within the at least one secondary zone by the at least one secondary sensor, wherein the suppression effect is selectively controllable to suppress the haptic effect within the at least one secondary zone through destructive interference between the suppression effect and the haptic effect within the at least one secondary zone.

2. The method of claim 1, further comprising generating secondary control signals for the at least one secondary actuator based on feedback from the at least one secondary sensor located in the at least one secondary zone.

3. The method of claim 1, further comprising detecting the haptic effect in the primary zone with at least one primary sensor located in the primary zone.

4. The method of claim 3, further comprising generating primary control signals for the primary actuator based on feedback from the at least one primary sensor located in the primary zone.

5. The method of claim 1, further comprising actuating the at least one secondary actuator to generate a localizing effect within the primary zone, wherein the localizing effect is selectively controllable to localize the haptic effect within the primary zone through at least one of constructive interference and destructive interference between the localizing effect and the haptic effect within the primary zone.

6. The method of claim 1, further comprising actuating the at least one secondary actuator to generate an amplifying effect, wherein the amplifying effect is selectively controllable to amplify the haptic effect through constructive interference between the amplifying effect and the haptic effect.

7. A non-transitory computer readable medium having instructions stored thereon that, when executed by a processor, cause the processor to perform the operations comprising:
generating a haptic effect with a primary actuator in a primary zone of a user interface, wherein the user interface includes the primary zone and at least one secondary zone;
detecting the haptic effect generated by the primary actuator within the at least one secondary zone using at least one secondary sensor located in the at least one secondary zone; and
actuating at least one secondary actuator within the at least one secondary zone to generate a suppression effect to suppress the haptic effect generated by the primary actuator within the at least one secondary zone upon detection of the haptic effect within the at least one secondary zone by the at least one secondary sensor, wherein the suppression effect is selectively controllable to suppress the haptic effect within the at least one secondary zone through destructive interference between the suppression effect and the haptic effect within the at least one secondary zone.

8. The non-transitory computer readable medium of claim 7, further comprising generating secondary control signals for the at least one secondary actuator based on feedback from the at least one secondary sensor located in the at least one secondary zone.

9. The non-transitory computer readable medium of claim 7, further comprising detecting the haptic effect in the primary zone with at least one primary sensor located in the primary zone.

10. The non-transitory computer readable medium of claim 9, further comprising generating primary control signals for the primary actuator based on feedback from the at least one primary sensor located in the primary zone.

11. The non-transitory computer readable medium of claim 7, further comprising actuating the at least one secondary actuator to generate a localizing effect within the primary zone, wherein the localizing effect is selectively controllable to localize the haptic effect within the primary zone through at least one of constructive interference and destructive interference between the localizing effect and the haptic effect within the primary zone.

12. The non-transitory computer readable medium of claim 7, further comprising actuating the at least one secondary actuator to generate an amplifying effect, wherein the amplifying effect is selectively controllable to amplify the haptic effect through constructive interference between the amplifying effect and the haptic effect.

13. A system for isolating one or more effects in a haptic interface, comprising:
a user interface including a primary zone and at least one secondary zone;
a primary actuator located in the primary zone;
at least one secondary actuator located in the at least one secondary zone;
at least one secondary sensor located in the at least one secondary zone;
at least one controller in communication with the primary actuator and the at least one secondary actuator, the at least one controller being configured to:
generate a haptic effect with the primary actuator in the primary zone;
detect the haptic effect generated by the primary actuator within the at least one secondary zone using the at least one secondary sensor located in the at least one secondary zone; and
actuate the at least one secondary actuator in the at least one secondary zone to generate a suppression effect to suppress the haptic effect generated by the primary actuator within the at least one secondary zone upon detection of the haptic effect within the at least one secondary zone by the at least one secondary sensor, wherein the suppression effect is selectively controllable to suppress the haptic effect within the at least one secondary zone through destructive interference between the suppression effect and the haptic effect within the at least one secondary zone.

14. The system of claim 13, wherein the at least one secondary zone is located adjacent to the primary zone.

15. The system of claim 13, wherein the at least one controller actuates the at least one secondary actuator to generate the suppression effect when the haptic effect is detected in the at least one secondary zone by the at least one secondary sensor.

16. The system of claim 15, wherein the at least one controller generates secondary control signals for the at least one secondary actuator based on feedback from the at least one secondary sensor located in the at least one secondary zone.

17. The system of claim 13, further comprising at least one primary sensor located in the primary zone for detecting the haptic effect in the primary zone.

18. The system of claim 17, wherein the at least one controller is further configured to generate control signals for the primary actuator based on feedback from the at least one primary sensor.

19. The system of claim 13, wherein the at least on secondary zone comprises a frame bounding at least the primary zone, the at least one secondary actuator comprising at least one frame actuator located in the frame.

20. The system of claim 13, wherein the at least one controller is further configured to actuate the at least one secondary actuator to generate a localizing effect within the primary zone, wherein the localizing effect is selectively controllable to localize the haptic effect within the primary zone through at least one of constructive interference and destructive interference between the localizing effect and the haptic effect within the primary zone.

21. The system of claim 13, wherein the at least one controller is further configured to actuate the at least one secondary actuator to generate an amplifying effect, wherein the amplifying effect is selectively controllable to amplify the haptic effect through constructive interference between the amplifying effect and the haptic effect.

* * * * *